United States Patent

Kennedy

[15] 3,693,143

[45] Sept. 19, 1972

[54] PROCESS AND APPARATUS FOR FACILITATING THE LANDING OF A VEHICLE ON A LANDING SURFACE

[72] Inventor: Francis V. Kennedy, 9007-B Bong Loop, Moses Lake, Wash. 98837

[22] Filed: June 22, 1970

[21] Appl. No.: 48,284

[52] U.S. Cl. .............................340/27 NA, 356/1
[51] Int. Cl. ....................................G08g 5/02
[58] Field of Search..............356/1, 4, 28, 8, 16, 51; 343/61 R, 112 D, 112 R, 15 R; 340/25–27, 24, 27 AT, 27 NA

[56] References Cited

UNITED STATES PATENTS

| | | | |
|---|---|---|---|
| 3,180,205 | 4/1965 | Heppe et al. | 356/1 |
| 3,499,112 | 3/1970 | Heilmeier et al. | 178/7.7 |
| 2,316,751 | 4/1943 | Adler, Jr. | 356/1 |
| 2,489,222 | 11/1949 | Herbold | 356/1 |

*Primary Examiner*—Kathleen H. Claffy
*Assistant Examiner*—Randall P. Myers
*Attorney*—Wells, St. John & Roberts

[57] ABSTRACT

A process and apparatus for facilitating the landing of a vehicle such as an aircraft on a landing surface by projecting two radiation beams downward from the aircraft at fixed angles criss-crossing the beams below the aircraft coincident with the elevation of the landing gear and producing spots on the landing surface that move together in relation to the rate of descent of the aircraft. The spots come together when the landing gear touches down. Display means is provided to present representations of the spots before the pilot. Movement of the aircraft controls by the pilot to gently bring the spots together will then result in a smooth, safe and well-controlled landing.

4 Claims, 8 Drawing Figures

INVENTOR.
Francis V. Kennedy
BY
Wells, St. John & Roberts
Attys.

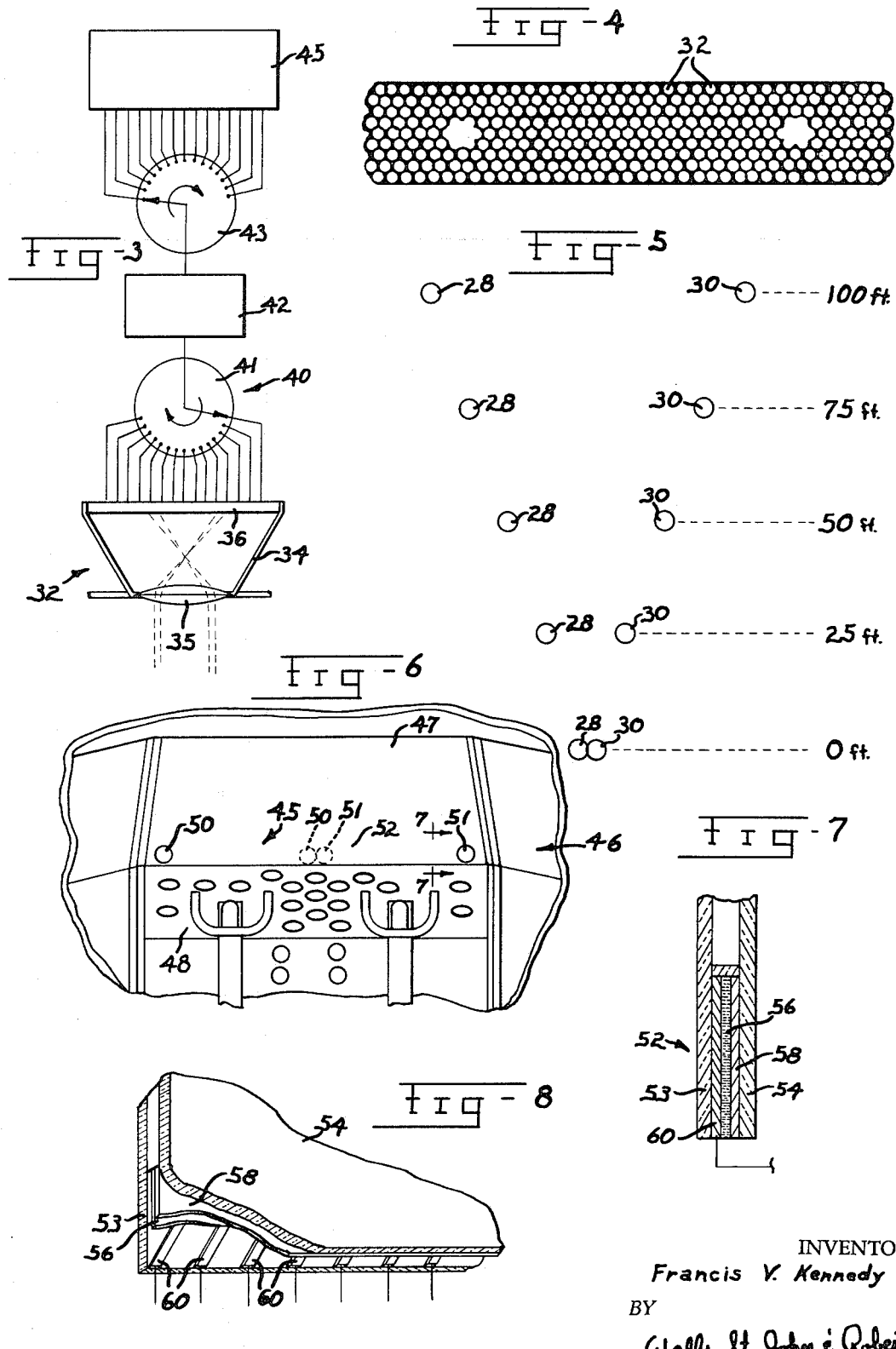

3,693,143

PROCESS AND APPARATUS FOR FACILITATING THE LANDING OF A VEHICLE ON A LANDING SURFACE

BACKGROUND OF THE INVENTION

This invention relates to processes and apparatus for facilitating the landing of a vehicle on a landing surface and more particularly processes and apparatus for determining the relative distance between the vehicle and the landing surface and the rate of descent toward the landing surface.

As the speed, complexity and size of aircraft increase, it becomes more and more difficult for the pilot to make a visual judgment or to "feel" the relative position of the aircraft in relation to the landing surface. Almost every day several landing deficiencies are reported. The landing deficiencies extend all the way from rough or bounced landings to landings short of the runway resulting minimumly in passenger discomfort and more seriously to damage to the aircraft, particularly to the landing gear, and injury or death to the passenger. The misjudgment of only a few feet has serious consequences. Although very complicated and sophisticated altimeters, rate of descent devices and landing aids have been developed, there is still an unfulfilled need to provide satisfactory means to enable the pilot to make a better visual judgment concerning the relative distance between the aircraft landing gear and the landing surface.

Most pilots of small light aircraft generally, through experience, are able to develop the visual judgment or "feel" for the relative position of the aircraft landing gear above the runway during the landing approach to enable the pilot to guide the aircraft in a proper guide path and to flare the path at the proper time to softly land the aircraft on the runway.

Pilots of faster and larger aircraft have that it is more difficult even with extensive training and experience to develop a visual judgment or "feel" of the relation of the aircraft landing gear and the ground during the landing approach. Much of this difficulty can be lodged with the limited visibility and the remoteness of the pilot from the location of the landing gear. Some jet aircraft require the aircraft to assume a substantially nose-up attitude during the landing approach elevating the pilot even higher above the landing gear. It is not unusual for the pilot to be more than 25 feet above the landing gear when the landing gear touches down. This problem becomes even more accented with the advent of the "jumbo" jet aircraft even though very sophisticated altimeters, rate of descent devices and landing aids have been developed. Although some of these devices have proven to be quite adequate for higher elevations for navigational aids, they have limited use in assisting the pilot during the last hundred feet of descent. Examples of such devices are described in U.S. Pat. Nos. 1,940,114; 2,206,036; 2,280,126; 2,581,847; 2,887,927; 2,958,253; 3,003,451; 3,004,258; 3,103,663, and 3,418,458 and British Pat. No. 1,144,577. Other devices utilize range finders in which two light receivers are maintained focused on the same object on the ground with which the converging angle between the light receivers being measured to calculate the altitude of the aircraft.

One of the principal objects of this invention is to provide an effective process and apparatus for assisting the pilot in smoothly landing an aircraft on a landing surface or runway.

An additional object of the invention is to provide a process and apparatus for determining the rate of descent and distance of the aircraft landing gear from the ground during the landing sequence.

A further object of this invention is to provide a process and apparatus which presents the pilot with an accurate representation of the distance of the landing gear from the ground and the rate of descent in a visual sensory means that is meaningful to the pilot and which will, with experience, enable the pilot to make a correct visual judgment in landing the aircraft.

An additional object of this invention is to provide an apparatus that provides altitude and rate of descent information to the pilot in such a manner that the pilot can quickly appreciate the relative magnitude of these values while maintaining the focus of his eyes forward of the aircraft.

A further object of this invention is to provide a landing monitor that is totally self-contained within the aircraft with no dependence upon ground generated signals or equipment.

An additional object of this invention is to provide a landing monitor that will greatly reduce the cost of training pilots, particularly those undergoing transition training to larger aircraft.

A further object of this invention is to provide a landing monitor that is operable under various weather conditions.

A still further object of this invention is to provide a landing monitor that is quite inexpensive to manufacture, install, and operate.

These and other objects and advantages of this invention will become obvious to those skilled in the art upon reading of the following detailed description.

BRIEF DESCRIPTION OF THE DRAWINGS

A preferred embodiment of this invention is illustrated in the accompanying drawings, in which:

FIG. 3 is an illustration schematic view showing a sensing device for sensing the location and relative movement of the spots on the landing surface and directing the information to a peripheral vision display located in the aircraft cockpit;

FIG. 4 is an enlarged fragmentary view of a portion of the sensing devices showing a plurality of sensing elements;

FIG. 5 is an illustration sequence view showing the relative location of the spots with the aircraft at various heights above the landing surface;

FIG. 6 is an illustration view of a portion of an aircraft cockpit as viewed by the pilot showing the peripheral display positioned adjacent a windshield;

FIG. 7 is a cross-sectional view taken along line 7—7 in FIG. 6 showing a vertical cross-section of the display device; and FIG. 8 is a illustration perspective view of a section of the display device.

DETAILED DESCRIPTION OF A PREFERRED EMBODIMENT

Figure 1:
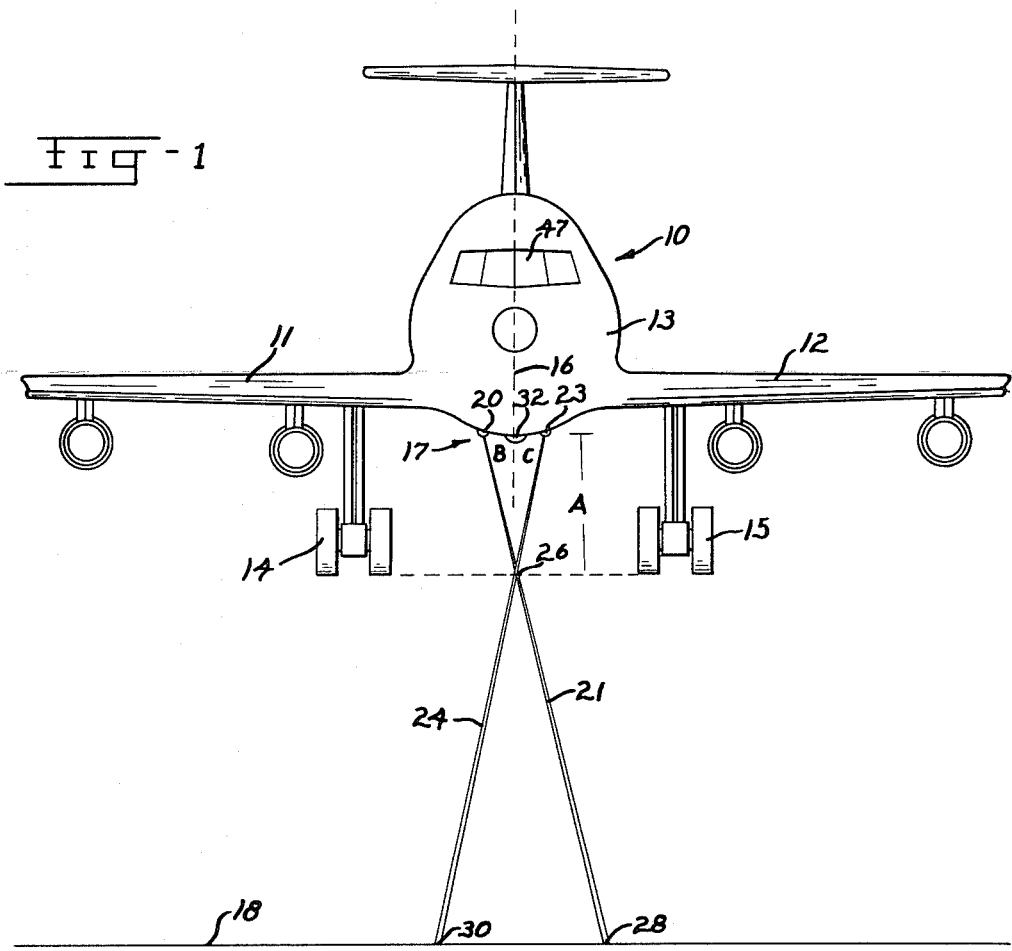
FIG. 1 is an illustration view of an aircraft approaching a landing surface with its landing gear extended and two radiation beams projecting downwardly from the airplane criss-crossing at the elevation of the projected landing gear and forming two spaced spots on the landing surface.
Figure 2:
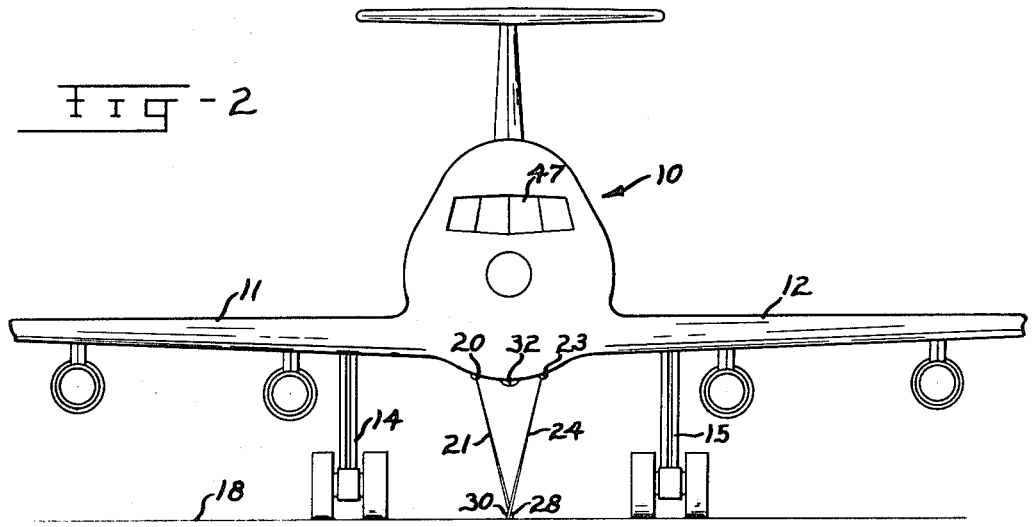
FIG. 2 is a view similar to FIG. 1 except showing the aircraft with the landing gear engaging the surface and the ground spots tangent to each other.

In the broad aspect this invention concerns the landing of a vehicle such as an aircraft or spacecraft on a landing surface. To illustrate the invention, an aircraft vehicle 10 is shown in FIGS. 1 and 2 having wings 11, 12 that extend outwardly from the body or fuselage 13. Landing gear 14, 15 extend downward from the aircraft to initially engage the landing surface and support the aircraft on the landing surface. The landing gear 14 and 15 extended toward a distance A from the fuselage 13. The landing gear 14, 15 are generally mounted equally spaced from a center line 16 of the aircraft. Apparatus 17 for performing the process of this invention, is incorporated within the aircraft with no ground transmitting or ground equipment required. The purpose of the apparatus is to determine the distance of the aircraft above a landing surface 18 and the rate of descent of the aircraft towards the surface 18. The apparatus 17 may be referred to as a landing monitor. The apparatus 17 includes two radiation beam projectors 20 and 23 that are mounted to the aircraft and carried thereby for producing two radiation beams 21 and 24. The radiation projectors 20 and 23 are horizontally spaced from each other to project radiation beams downward at fixed converging angles with the beams criss-crossing below the aircraft at a distance substantially equal to distance A. The converging fixed angles are preferably equal and are identified as B and C. In this embodiment, the projectors are equally spaced on both sides of the aircraft center line 16 with the beams directed downward and inward toward each other intersecting at 26. The beams 21 and 24 form spots 28 and 30 respectively on the landing surface. As the aircraft descends, the spots 28 and 30 move towards each other with the distance between the spots being related directly to the height of the aircraft from the landing surface and the rate at which the spots 28 and 30 move toward each other directly proportional to the rate of descent of the aircraft. Various types of radiation sources may be utilized. Although visible light radiation sources may have some applicability, a preferred source would be an infrared radiation source. Laser beam projectors emitting infrared radiation could be utilized. Various types of infrared projectors would be suitable.

A radiation monitoring or sensing device 32 is mounted to the aircraft and projects downward intermediate the radiation projectors 20 and 23 for sensing and monitoring the location and movement of spots 28 and 30 on the landing surface. The sensing device 32 includes a case 34 (FIG. 3) having a window or lens means 35 and a bank or grid of sensing elements 36 that are sensitive to the reflected radiation the spots 28 and 30. The lens means 35 and the sensing elements 36 are positioned in such a relation to the spots on the landing surface that the reflected radiation of the spots energize sensing elements that are spaced in direct proportion to the spacing of the spots. Filter elements and the like may be positioned adjacent the lens means 35 for limiting the wave length of the radiation passing into the sensing device. The energized sensing elements generate electrical signals that are monitored by an electrical system 40.

The specific type of sensing elements 36 may be varied depending upon the application and the wavelength of the beam 21 and 24. If the radiation projectors are projecting infrared radiation then the sensing elements will sensitive to infrared radiation. Specific types of sensing elements that are satisfactory for sensing infrared radiation include thermistor bolometers and infrared sensitive semi-conductors. The sensing elements may be placed in one or more rows or in an elongated grid as shown in FIG. 4. Alternatively the sensing device 32 can be of a scanning type having a single or a small number of sensing elements with an optical scanning means such as a scanning mirror which is well known in the art and utilized in several commercially available infrared cameras, for projecting the radiation onto the sensing elements.

The output from the sensing elements is processed by an electrical processing system 40 to a display device 45 located in a cockpit 46 of the aircraft. An example of the electrical processing system includes a synchronized stepping switch mechanism 41 that receives the signals from the sensing elements and transmits the signals to an amplifier 42 for amplification. A second synchronized stepping switch 43 synchronized with the stepping switch 41 transmits the output of the amplifier to the display device 45. The electrical processing system 40 is shown for illustration purposes only, contemplating that numerous other systems can be devised by the persons skilled in the art to transmit the output of the sensing device to the display device in the manner desired for the particular application.

The cockpit 46 includes a windshield 47 enabling the pilot to view the space ahead of the aircraft. An instrument panel 48 is usually positioned immediately below the windshield for assisting the pilot in operating the aircraft. The display device 45 has a visual indicator means adapted to be mounted within the periphery of the field of vision of the pilot and controllable to provide a moving optical stimulus to the pilot of the ground spots conveying to the pilot the information concerning the rate of descent and the height of the aircraft above the landing surface. Specifically the indicator means is designed to produce two images that move or visually appear to move toward each other at a rate directly proportional to the rate of descent with the distance between the images being directly proportional to the height of the landing gear above the landing surface.

An example of such a display device includes an elongated transparent strip 52 that is mounted in the windshield of immediately below the windshield. The strip 52 produces two images or representations 50 and 51 which simulate the spots 28 and 30. The images 50 and 51 may be in the form of dots, spots or lines that are normally spaced and move towards each other in direct proportion to the movement of the sports 28 and 30. The display device 45 is designed so that when the landing gear initially engage the landing surface the images 50 and 51 will at least engage each other. As the aircraft settles onto the landing surface the images overlap. The strip 52 can be constructed having a plurality of light generating elements such as lamps or light generating semi-conductors positioned in a row with the lights being energized successively from both ends of the strip towards the center. As a preferred embodiment the strip produces two substantially opaque images in the transparent strip that are moved or appeared to move toward each other. The opaque images are produced by a layer 56 of normally transparent nematic liquid crystal material and a grid of transparent electrodes for passing current through the nematic liquid crystal material at localized areas to produce opaque images. The layer 56 (FIG. 7) is sandwiched between two transparent walls 53 and 54 preferably made of glass or plastic. A plurality of longitudinal electrodes 58 contact one side of the layer 56 and a plurality of transparent transverse electrodes 60 contact the other side of the layer 56 forming a grid. The thickness of the layer 56 and the electrodes 58 and 60 are in the neighborhood of one-thousandth of an inch. The electrodes can be constructed by depositing thin layers of indium oxide or stannic oxide on the walls. The threshold voltage required to turn localized regions opaque is in the range of $0.5 \times 10^4$ to $1 \times {}^4$ volts per centimeter in layer thickness. More specific information concerning the nematic liquid crystal material is contained in U.S. Pat Nos. 3,499,112 and 3,449,702. One of the walls 53 and 54 may be the windshield itself. For new aircraft it may be desirable to construct the windshield with the layer 56 sandwiched between two layers of the windshield. For existing aircraft, the strip may be adapted to be mounted on the instrument panel.

During operation, voltages are selectively applied across the electrodes 58 and 60 above the threshold voltage to produce opaque images in the localized area of the layer where the selected electrodes cross. By successively applying the voltage to adjacent electrodes 60, an apparent movement of the opaque image can be created. The electrodes are interconnected to the sensing elements 36 in such a manner that the images 50 and 51 move toward each other at a rate directly proportional to the rate that the spots 28 and 30 are moving toward each other on the ground with the distance between the images 50 and 51 being directly proportional to and being representative of the distance between the spots 28 and 30. The images 50 and 51 will normally initially originate near the ends of the strip 52 and move towards each other towards the center of the strip 52. By this means the pilot through his peripheral vision will visually sense the movement of the images and their relative distances and make a judgment as to the rate of descent and altitude of the aircraft based upon the visual input. It should be particularly noted that the visual display is of such a nature that the vital information is transmitted to and received by the pilot without having to focus his eyes directly on the display device. When the images 50 and 51 are quite close together the pilot will sense that the landing gear is immediately above the ground. When the images engage each other the pilot will sense that the landing gear has initially engaged the landing surface. As the airplane settles onto the landing surface the images may overlap each other. Should the aircraft bounce during landing the images will spread apart indicating that the landing gear has left the landing surface.

Instead of using an amplifier in the electrical system 40, it may be desirable to provide a base voltage across the electrodes 58 and 60 just below the of the layer 56.

The output voltage from the sensing elements 36 would be sufficient to raise the applied voltage above the threshold voltage and create localized opaque images corresponding to the spots.

Also, it may be desirable to have more than one display device for use by other members of the aircraft crew. Alternatively in additional display strip may be mounted on the instrument panel to be monitored by the pilot along with other instrument approach and automatic landing indicators.

It should be appreciated that the output of the sensing elements 36 can be utilized as input signals to automatic control systems that control the elevator and throttle controls during automatic landings. Also, it is recognized that only one beam 21 or 24 may be utilized to create only one spot on the landing surface with the other spot being mirrored electronically to produce the two images 50 and 51.

It should be understood that the above described embodiment is simply illustrative of the principles of the invention and that numerous other embodiments may be readily devised without deviating from the principles thereof. Therefore, only the following claims are intended to define this invention.

What is claimed is:

1. A landing aid instrument for assisting pilots in the manual control of a vehicle such as an aircraft while landing on a landing surface in which the aircraft has means for detecting the relative distance between the vehicle and the landing surface and the rate of descent of the vehicle, comprising:

means for displaying two normally spaced images in the peripheral field of vision of the pilot;

means responsive to the d detecting means for moving the images toward one another in direct proportion to the rate of descent with the distance between the images being proportional to the distance between the vehicle and the landing surface to provide the pilot with a visual stimulus of the elevation of the vehicle above the landing surface and the rate of descent of the vehicle without the pilot having to focus his eyes on the instrument;

in which the display means includes a normally transparent elongated layer of nematic liquid crystal material that is capable of forming opaque images that visually appear to be moving toward each other.

2. The landing aid instrument as defined in claim 1 wherein the means responsive to the detecting means includes a longitudinal electrode extending substantially the length of the layer and a plurality of separate transverse electrodes spaced along the length of the layer for sequentially passing electrical currents through the layer to form the images.

3. Apparatus for aiding a pilot in the manual control of a vehicle such as an aircraft while landing on a landing surface, comprising:

two radiation projector means mounted to the vehicle projecting two radiation beams downward from the vehicle at fixed converging angles in which the beams crisscross to produce two spaced radiation spots on the landing surface which move toward each other at a rate directly proportional to the rate of descent to the distance between the vehicle and the landing surface;

radiation sensing means mounted to the vehicle for sensing the distance between the spots and the rate of movement of the spots;

visual display means responsive to the sensing means having two normally spaced images located in the peripheral field of vision of the pilot in which the images are moved toward each other in direct proportion to the movement of the spots with the distance between the images being directly proportional to the distance between the vehicle and the landing surface; and in which the visual display means includes a normally transparent elongated layer of nematic liquid crystal material that is capable to forming opaque images when an electric current is passed therethrough; and means for sequentially and in response to the sensing means passing electrical currents through the layer along the length of the layer to produce two opaque images that appear to be moving towards each other.

4. The apparatus as defined in claim 3 wherein the means for passing electrical current through the crystal includes a longitudinal electrode extending substantially the length of the layer and a plurality of separate transverse electrodes spaced along the length of the crystal engaging the layer for passing electrical currents between the longitudinal and transverse electrodes and through the layer to form the images.

* * * * *